No. 637,087. Patented Nov. 14, 1899.
A. T. COLLIER.
MEANS FOR SECURING PNEUMATIC TIRES TO WHEEL RIMS.
(Application filed May 26, 1899.)
(No Model.) 2 Sheets—Sheet 1.
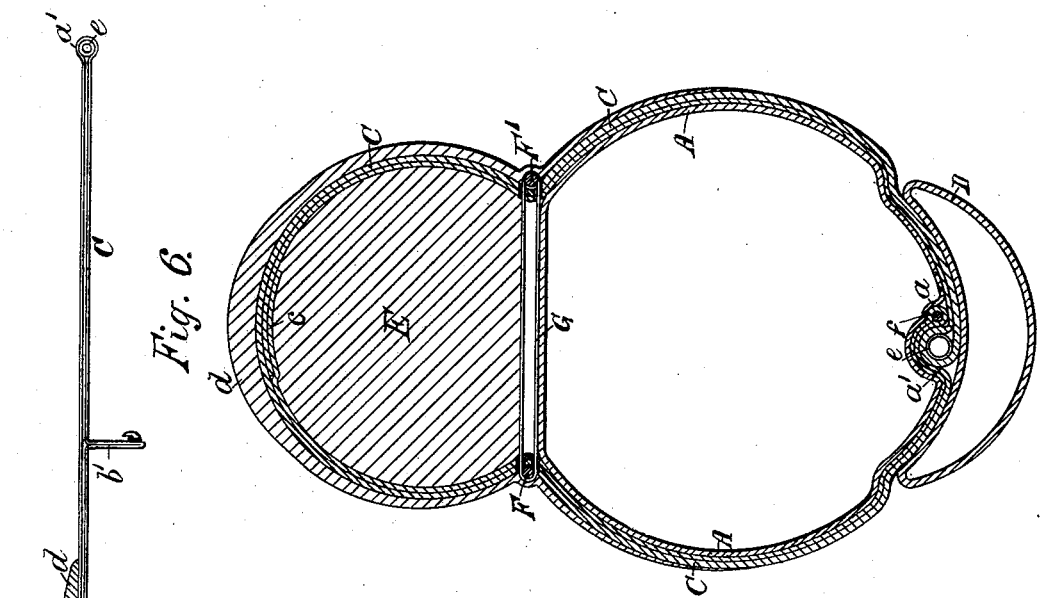
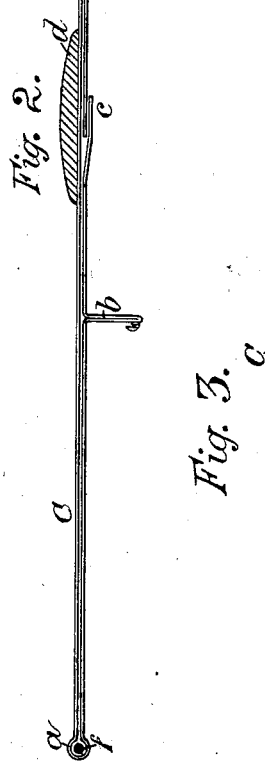
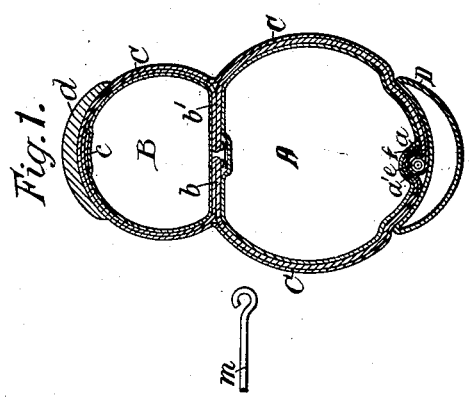
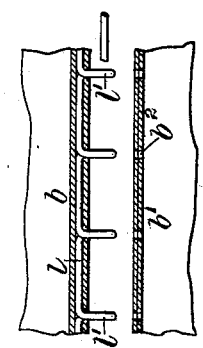
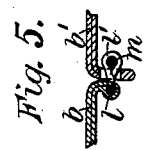
Witnesses
Inventor
Arthur T. Collier
by James L. Norris
atty
THE NORRIS PETERS CO., PHOTO-LITHO., WASHINGTON, D. C.

No. 637,087. Patented Nov. 14, 1899.
A. T. COLLIER.
MEANS FOR SECURING PNEUMATIC TIRES TO WHEEL RIMS.
(Application filed May 26, 1899.)
(No Model.) 2 Sheets—Sheet 2.

Witnesses

Inventor
Arthur T. Collier
by James L. Norris
Atty

THE NORRIS PETERS CO., PHOTO-LITHO., WASHINGTON, D. C.

UNITED STATES PATENT OFFICE.

ARTHUR THOMAS COLLIER, OF ST. ALBANS, ENGLAND.

MEANS FOR SECURING PNEUMATIC TIRES TO WHEEL-RIMS.

SPECIFICATION forming part of Letters Patent No. 637,087, dated November 14, 1899.

Application filed May 26, 1899. Serial No. 718,402. (No model.)

*To all whom it may concern:*

Be it known that I, ARTHUR THOMAS COLLIER, engineer, a subject of the Queen of Great Britain, residing at Gonvena, St. Albans, England, have invented certain new and useful Improvements Relating to Pneumatic Tires and to Means for Securing the Same on Wheel-Rims, of which the following is a specification, reference being had to the accompanying drawings, in which—

Figure 7:
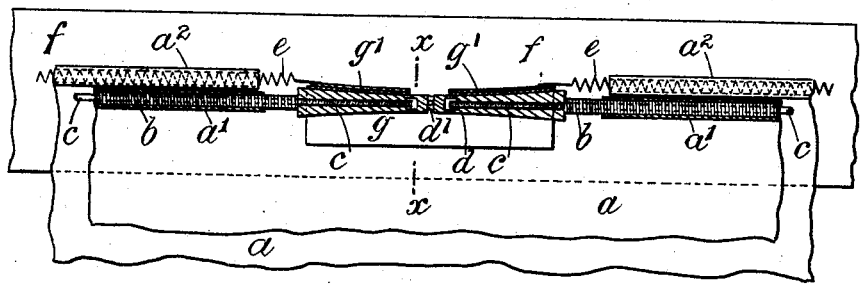
Figure 8:
Figure 9:
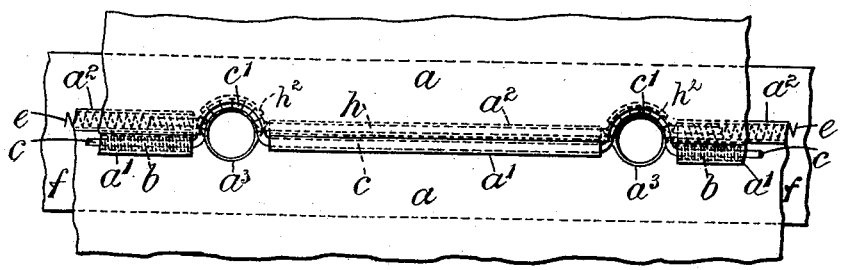
Figure 10:
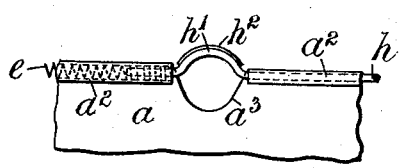
Figure 11:
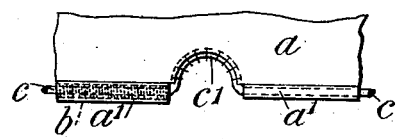

Figure 1 is a transverse section of one form of my improved tire. Fig. 2 is a transverse section of the sheath or cover of the said tire, showing the same extended to its full width. Fig. 3 is a transverse section illustrating the manner in which the tire is put upon the wheel. Fig. 4 is a sectional under side view, and Fig. 5 a transverse section, illustrating one method of fastening together the two inner flaps. Fig. 6 is a transverse section, drawn to a larger scale, of another form of my improved tire, having a solid ring or cushion in the outer compartment and an air-tube in the inner compartment of the sheath. Fig. 7 is a plan, partly in section, of a portion of a wheel-rim with a tire secured thereon by my improved fastening. Fig. 8 is a transverse section on the line $x\ x$, Fig. 7. Fig. 9 is an under side view of another portion of the wheel-rim and tire, and Figs. 10 and 11 are views illustrating details of construction.

My invention relates to pneumatic tires and to means for securing the same upon the wheels of velocipedes and other vehicles.

My said invention is chiefly designed to provide an improved tire of the kind or class in which there are two concentric air tubes or chambers.

My said invention, however, also comprises a tire in which a solid or hollow ring or cushion is contained in the outer chamber or compartment of the sheath and an inflatable air-tube in the inner chamber or compartment thereof.

My said invention also partly consists in a pneumatic tire in which the sheath or cover is made of canvas or other flexible material in one piece folded upon itself, so as to form tubes or passages along the edges of said sheath or cover and internal flaps, the two edges of the said piece of canvas or other material overlapping each other, so as to provide three thicknesses or layers at the tread of the tire, the said flaps being adapted to be secured together by lacing or otherwise to contract the tire between the concentric chambers or compartments and to inclose the elastic ring or cushion in the outer chamber or compartment.

My said invention also partly consists in a pneumatic tire comprising a sheath or cover having two concentric compartments, an inflatable air-tube in the inner compartment, and an elastic cushion in the outer compartment thereof, and continuous wires at the sides of said sheath or cover drawn together by lacing or otherwise to contract said sheath between the two concentric compartments thereof; and my said invention also partly consists in the various combinations hereinafter described, and pointed out in the claims.

Referring to Figs. 1 to 6 of the drawings, A B are concentric air tubes or chambers. C is the sheath or cover for inclosing the same and holding them in place upon the tire. D is the wheel-rim.

The sheath or cover C is made of canvas or other flexible material in one piece, which is folded upon itself, as shown in transverse section in Fig. 2, so as to form tubes or passages $a\ a'$ along the edges of the said sheath or cover, respectively, for the purposes hereinafter explained, and also inner projections or flaps $b\ b'$, which are adapted to be laced or otherwise fastened together to secure the outer air-tube in the outer part of the sheath or cover C, as shown in Figs. 1 and 3. The edges of the piece of canvas or other flexible material forming the sheath C overlap one another at the tread of the tire, as shown at $c$, Figs. 1 and 2, a strip $d$ of india-rubber or other suitable material being secured upon the outer side of the said canvas or other flexible material, as shown, to form the tread of the tire.

In pneumatic tires having concentric air tubes or chambers and in which the sheath or cover is bound upon the wheel-rim, as hereinafter described, it is necessary in order to insure the setting of the said tubes or chambers (when inflated) in their proper position relatively to each other and to the wheel-rim that the sheath or cover should be much larger in circumference in proportion to the wheel-rim than is requisite in single-chambered tires. I find that for a wheel-rim of twenty-six inches in diameter a sheath or cover of about twenty-nine inches in diameter should be used. Then by reason of the stretching of the canvas the tire when put upon the wheel-rim and inflated will be about thirty inches in diameter. The said sheath or cover is made of canvas or like material cut on the bias or of canvas made on the bias, with warp-threads lying closely together and with a few weft-threads to hold them together, which material is treated with india-rubber solution, so that when folded upon itself, as above described, the parts in contact will be united.

In order that the edges of the sheath or cover C may lie snugly one upon the other in the groove of the wheel-rim, notwithstanding the extra large diameter of the said sheath or cover, and that the said sheath shall set properly in the wheel-rim when the tire is inflated, the edges must be about equally contracted at all points around the same. I therefore insert in the tube or passage $a'$ a spiral spring $e$ or an elastic cord which can be stretched to allow it to be passed over the edge of the grooved wheel-rim D and which will then contract, so that it will draw in the canvas of the sheath or cover uniformly throughout its circumference and will closely hug the part of the rim of smaller diameter within the groove, and I introduce into the tube or passage $a$ a binding wire rope or cord $f$, provided with means for tightening it.

I sometimes secure the two inner flaps $b$ $b'$ together by means of a device such as I have shown in Figs. 4 and 5, comprising a wire or wires $l$, secured in the edge of one flap $b$ and having eyes $l'$, adapted to be passed through holes $b^2$ in the other flap $b'$, and a rod or rods $m$, which are thrust through the said eyes $l'$.

It will be seen that by reason of the sheath, with its inner flaps, being made in one piece of flexible material folded upon itself, as above mentioned, there are no parts which are liable to be separated or torn apart when the two tubes A B or either of the same are inflated and that when the rider's weight comes upon the inflated concentric air-tubes the tendency of the pressure will be to cause the two layers of each inner flap to adhere more closely. Moreover, the making of the tire as above mentioned very conveniently provides tubes or passages at the edges of the sheath to receive the aforesaid spiral spring and binding-wire, respectively, and affords three thicknesses of the canvas at the tread of the tire and a double thickness thereof at the other parts of the tire, the several thicknesses of canvas being united by the india-rubber solution and forming a sheath of light weight and of great strength and durability.

In Fig. 6 I have shown a modification of my invention wherein a solid ring or cushion E of india-rubber is inclosed in the outer concentric chamber of the tire and an air-tube A in the inner concentric chamber thereof. The inner flaps above described are in this arrangement dispensed with and the sheath C is contracted between the two chambers by means of continuous wires F F', one at each side of the tire, which wires are laced or otherwise drawn tightly toward each other, so as to contract the sheath as required at this part. In the arrangement shown the wires F F' are drawn together by means of a cord G passed through the sides of the sheath and around the said continuous wires. A strip of canvas or like material may, if desired, be placed above and below the lacing or stitching to complete the two chambers or compartments of the sheath. I can, if desired, provide eyelets in the sides of the sheath for the said cord to be passed through, or it can be passed through the canvas by means of a needle, or I can make the said continuous wires with hooks or the like extending through the sides of the sheath and lace them together by a cord passed around or through the said hooks or the like. In place of the wires F F', I can, if desired, use cords or strips of leather or other suitable material, drawn together by lacing or otherwise, to contract the tire between the concentric compartments thereof. This mode of contracting the tire is also advantageous when two concentric inflatable air-tubes are employed.

Referring to Figs. 7 to 11, $a$ $a$ indicate the two sides of the sheath or cover, and $f$ indicates the wheel-rim. I find it advantageous to introduce into the tube or passage $a'$ of the sheath $a$, Figs. 7 and 8, a spirally-coiled wire $b$, the adjacent convolutions whereof are approximately contiguous and through which is passed an extensible binding wire rope, wire, or cord $c$, provided with suitable means for tightening it, so that in the tightening of the said binding wire or cord it will slide freely within the said closely-coiled wire and will therefore not cause any puckering of the edges of the sheath. Consequently the tire when secured upon the wheel-rim $f$ will be of uniform size or thickness all around. I sometimes use a binding-wire provided with a tightening device comprising a screw-nut $d$, having right and left hand screw-threads and fitting upon the ends of the said wire $c$, which are correspondingly screw-threaded to receive it, the said screw-nut being preferably made with holes $d'$ for the insertion of a pin or toggle for turning it. To afford space for this tightening device without thickening of the tire at the part where the said device is situated and at the same time prevent blowing out of the edges of the sheath from beneath the said device, I cut away the closely-coiled wire $b$ and the spiral spring $e$ in the passage $a^2$ at this part, and I attach to the corresponding parts of the sheath $a$ curved metal plates or hooks $g$ $g'$, which extend partly around the tightening device and engage therewith. The curved parts of these plates are cut away at the middle to permit access to the said holes in the screw-nut.

To permit of the valve or valves being passed through the center of the wheel-rim, the aforesaid closely-coiled wire $b$ is made in two lengths, and between these two lengths the binding-wire $c$ is made with a semicircular bend $c'$, Figs. 9 and 11, which will extend around one side of the valve, one of such bends being provided for each valve when two valves are employed, as shown in Fig. 9. The aforesaid spiral spring $e$ is also made in two lengths, which are connected by means of a connecting wire or rod $h$, Figs. 9 and 10, brazed or otherwise secured to the two lengths of the spring and having one or two semicircular bends $h'$ to extend around the valve or valves on the same side thereof as the bends $c'$ of the binding-wire $c$, a semicircular piece being cut out of the edge of the sheath on the opposite side of each valve. Each bend $h'$ of the said connecting wire or rod $h$ is provided with a projection or flange $h^2$ to engage with the corresponding bend of the binding-wire, and thus prevent blowing out of the said connecting-wire $h$ from beneath the binding-wire $b$.

When I make my tire with a solid or hollow cushion in the outer chamber of the sheath, I sometimes make the said sheath with inner flaps having flanges of india-rubber embedded in the canvas or of other suitable material adapted to engage in a groove or grooves in the said cushion and secure the said cushion to the interior of the sheath and to the said flaps by means of india-rubber solution or cement. In a tire with a solid or hollow cushion in the outer compartment the outer coating of india-rubber may, if desired, cover the aforesaid continuous wire provided with hooks or with the aforesaid eyelets and laces.

What I claim is—

1. In a pneumatic tire, a sheath or cover made of canvas or other flexible material in one piece folded upon itself so as to form tubes or passages along the edges of said sheath or cover and internal flaps adapted to be secured together, the two edges of the said piece of canvas or other flexible material overlapping each other at the tread of the tire, substantially as, and for the purposes described.

2. A pneumatic tire comprising a sheath or cover made of canvas or other flexible material in one piece which is folded upon itself so as to form internal flaps and tubes or passages extending along the edges of said sheath or cover so that its edges shall overlap each other and form three thicknesses or layers of material at the tread of the tire, an outer elastic ring or cushion inclosed in said sheath by means of said flaps, an inflatable air-tube in said sheath concentric with said ring or cushion, an elastic cord or spring inclosed in one of said tubes or passages, and a binding wire rope, wire or cord, inclosed in the other tube or passage, substantially as hereinbefore described and for the purposes specified.

3. In a pneumatic tire, a sheath or cover made of canvas or other flexible material in one piece folded upon itself so as to form tubes or passages along the edges of the said sheath or cover and internal flaps adapted to be secured together to close the outer compartment and so as to form a treble thickness at the tread of the tire and a double thickness at other parts of the sheath and at the flaps, substantially as described.

4. The combination, in a tire having concentric compartments, of a sheath or cover, means for distending the compartments of said sheath or cover, continuous ligaments at the sides of said sheath or cover drawn together so as to contract said sheath between said compartments thereof, substantially as hereinbefore described.

5. In a pneumatic tire, the combination, with a sheath or cover having concentric compartments, of an inflatable air-tube in the inner compartment and an elastic ring or cushion in the outer compartment thereof, and continuous wires at the sides of said sheath drawn together so as to contract said sheath between the said compartments thereof, substantially as hereinbefore described.

6. In a pneumatic tire, the combination, with a sheath or cover having concentric compartments, of an inflatable air-tube in the inner compartment and an elastic ring in the outer compartment thereof, continuous ligaments at the sides of said sheath, and lacing extending through the said sheath or cover and around the said ligaments, substantially as, and for the purposes, hereinbefore described.

In testimony whereof I have hereunto set my hand in presence of two subscribing witnesses.

ARTHUR THOMAS COLLIER.

Witnesses:
DAVID YOUNG,
ALEXANDER W. ALLEN.